United States Patent
Sugiyama et al.

(10) Patent No.: US 12,136,238 B2
(45) Date of Patent: Nov. 5, 2024

(54) PROCESSING DEVICE RELATING TO INSPECTION OF INSPECTION OBJECT, INSPECTION SYSTEM OF INSPECTION OBJECT, PROCESSING METHOD RELATING TO INSPECTION OF INSPECTION OBJECT, AND NON-TRANSITORY STORAGE MEDIUM

(71) Applicant: KABUSHIKI KAISHA TOSHIBA, Tokyo (JP)

(72) Inventors: Nobukatsu Sugiyama, Kawasaki Kanagawa (JP); Junichiro Ooga, Kawasaki Kanagawa (JP); Yoshiyuki Ishihara, Kawasaki Kanagawa (JP); Junji Oaki, Kawasaki Kanagawa (JP); Hiroshi Ohno, Tokyo (JP); Hideaki Okano, Yokohama Kanagawa (JP); Hiroya Kano, Kawasaki Kanagawa (JP); Takahiro Kamikawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 17/675,851

(22) Filed: Feb. 18, 2022

(65) Prior Publication Data

US 2023/0071341 A1 Mar. 9, 2023

(30) Foreign Application Priority Data

Sep. 3, 2021 (JP) ................. 2021-144006

(51) Int. Cl.
*G06T 7/80* (2017.01)
*G06T 7/00* (2017.01)
*G06T 7/40* (2017.01)
*G06T 7/50* (2017.01)
*G06T 7/70* (2017.01)
*H04N 7/18* (2006.01)
*H04N 23/695* (2023.01)

(52) U.S. Cl.
CPC .............. *G06T 7/80* (2017.01); *G06T 7/0004* (2013.01); *G06T 7/40* (2013.01); *G06T 7/50* (2017.01);
(Continued)

(58) Field of Classification Search
CPC ........... G06T 7/80; G06T 7/0004; G06T 7/40; G06T 7/50; G06T 7/70;
(Continued)

(56) References Cited

U.S. PATENT DOCUMENTS 10,732,102 B2 8/2020 Ohno et al.
10,812,786 B2 10/2020 Ohno et al.
(Continued)

FOREIGN PATENT DOCUMENTS

CN 113096094 A * 7/2021
JP 2007-248241 A 9/2007
(Continued)

OTHER PUBLICATIONS

Khaled Belghith Using a Randomized Path Planner to Generate 3D Task Demonstrations of Robot Operations Jul. 2010 (Year: 2010).*
(Continued)

*Primary Examiner* — Nizar N Sivji
(74) *Attorney, Agent, or Firm* — Finnegan, Henderson, Farabow, Garrett & Dunner, LLP

(57) ABSTRACT

In an embodiment, a processing device relating to an inspection of an inspection object by a photography unit is provided. A processor of the processing device calculates a plurality of photography points as positions photographing the inspection object based on shape data in which a shape of a surface of the inspection object is indicated by a point group, and information relating to a position and a normal vector on the surface of the inspection object is defined by the point group. The processor executes analysis regarding
(Continued)

a path that passes through all of the calculated photography points and minimizes a sum of a movement cost from each of the photography points to a photography point of a next movement destination, and calculates a path corresponding to an analysis result as a path for moving the photography unit.

11 Claims, 6 Drawing Sheets

(52) U.S. Cl.
CPC .............. *G06T 7/70* (2017.01); *H04N 7/183* (2013.01); *H04N 23/695* (2023.01); *G06T 2207/30108* (2013.01)

(58) Field of Classification Search
CPC .......... G06T 2207/30108; H04N 7/183; H04N 23/695; G01N 21/8851; G01N 2021/9518; G05B 2219/37208; G05B 2219/37449; G05B 2219/37451; G05B 2219/45066; B25J 9/1697; B25J 9/1664; B25J 9/1684

See application file for complete search history.

(56) References Cited

U.S. PATENT DOCUMENTS

| | | | |
|---|---|---|---|
| 11,080,843 | B2 | 8/2021 | Inazumi et al. |
| 11,619,591 | B2* | 4/2023 | Kato ............... G01N 21/47 356/141.1 |
| 2018/0295270 | A1* | 10/2018 | Oshima .............. H04N 23/6811 |
| 2019/0080481 | A1* | 3/2019 | Yamaguchi ............... G06T 5/73 |
| 2019/0281213 | A1 | 9/2019 | Kato |
| 2022/0283584 | A1 | 9/2022 | Toyoshi et al. |

FOREIGN PATENT DOCUMENTS

| | | |
|---|---|---|
| JP | 2008-46103 A | 2/2008 |
| JP | 2011-75534 A | 4/2011 |
| JP | 2017-134617 A | 8/2017 |
| JP | 2019-124542 A | 7/2019 |
| JP | 2019-152557 A | 9/2019 |
| JP | 2019-158499 A | 9/2019 |
| JP | 2019-203796 A | 11/2019 |
| JP | 2019-215225 A | 12/2019 |
| JP | 2020-190509 A | 11/2020 |
| JP | 2021-67592 A | 4/2021 |
| WO | WO 2021/014752 A1 | 1/2021 |

OTHER PUBLICATIONS

An autonomous robot photographer—2003 (Year: 2003).*
H. Ohno et al., "One-shot BRDF imaging system to obtain surface properties," Optical Review vol. 28, pp. 655-661 (2021).
H. Ohno, "One-shot color mapping imaging system of light direction extracted from a surface BRDF," OSA Continuum Research Article, vol. 3, No. 12, pp. 3343-3350 (Dec. 15, 2020).
Khaled Belghith et al., "Using a Randomized Path Planner to Generate 3D Task Demonstrations of Robot Operations," IEEE Int'l Conf. on Autonomous and Intelligent Sys. (AIS), 6 page (2010).

* cited by examiner

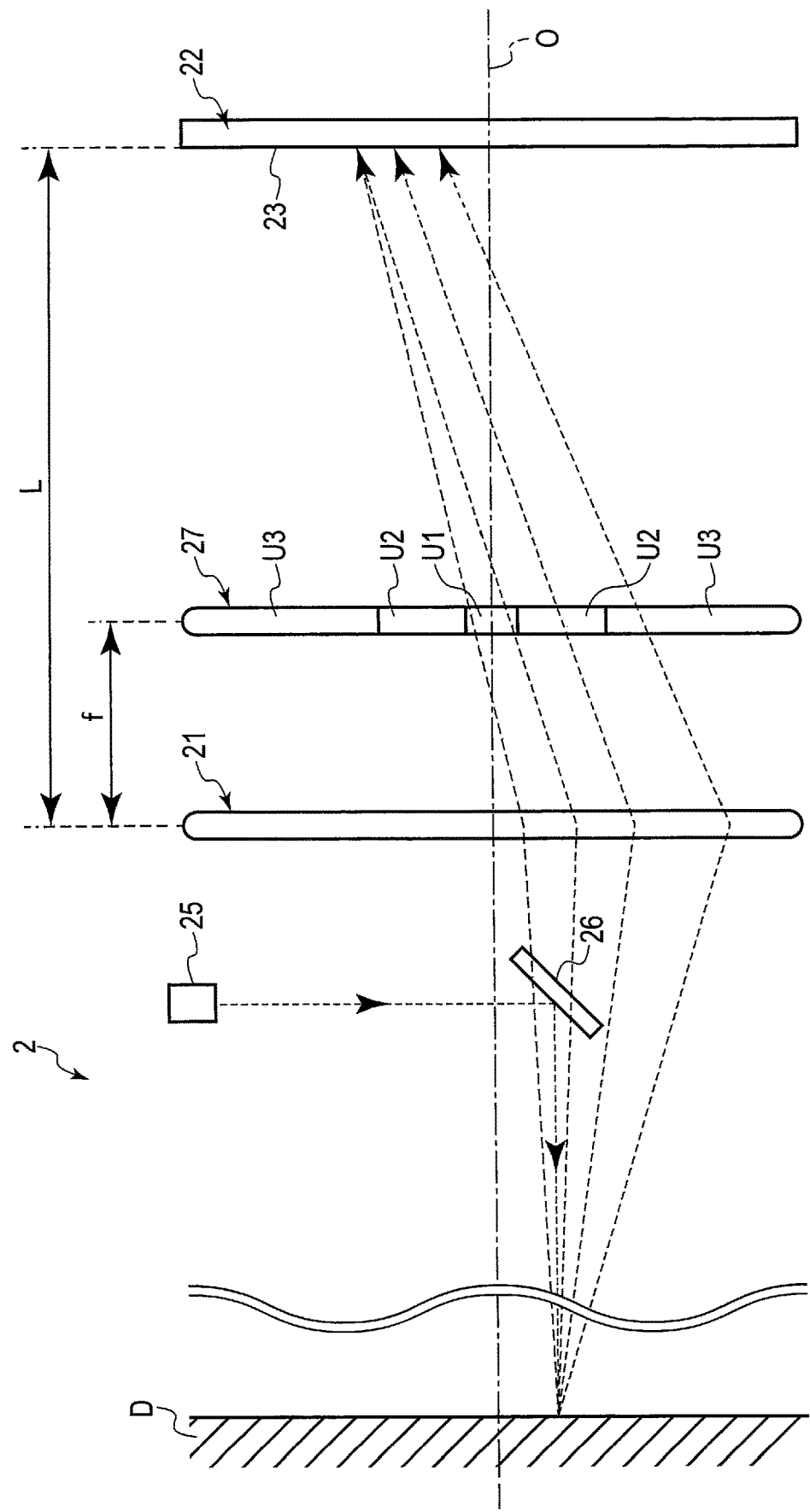
F I G. 3

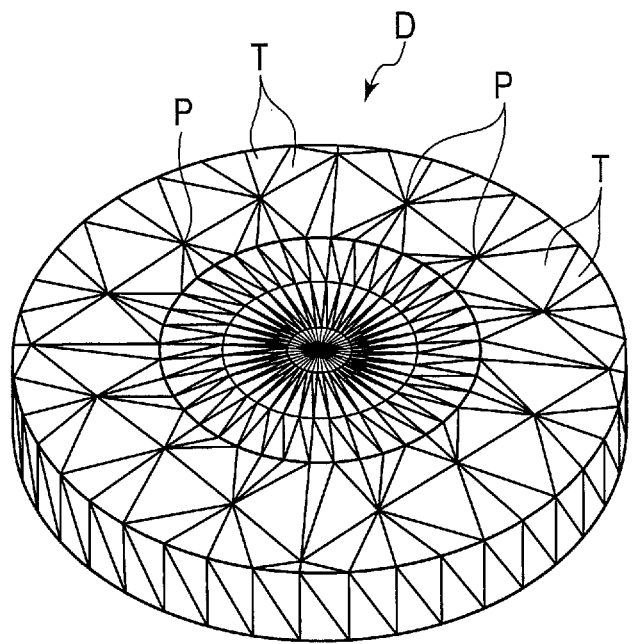
F I G. 4
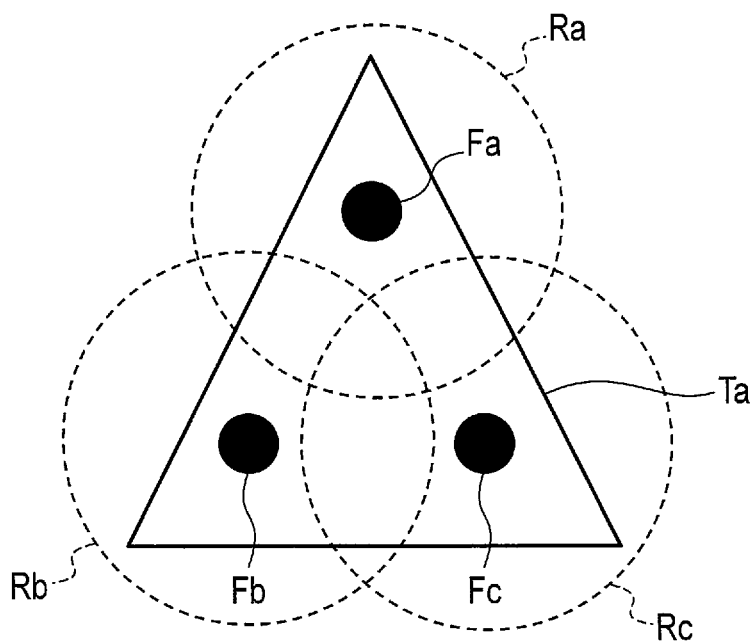
F I G. 5

PROCESSING DEVICE RELATING TO INSPECTION OF INSPECTION OBJECT, INSPECTION SYSTEM OF INSPECTION OBJECT, PROCESSING METHOD RELATING TO INSPECTION OF INSPECTION OBJECT, AND NON-TRANSITORY STORAGE MEDIUM

CROSS-REFERENCE TO RELATED APPLICATIONS

This application is based upon and claims the benefit of priority from Japanese Patent Application No. 2021-144006, filed Sep. 3, 2021; the entire contents of which are incorporated herein by reference.

FIELD

Embodiments described herein relate generally to a processing device relating to an inspection of an inspection object, an inspection system of an inspection object, a processing method relating to an inspection of an inspection object, and a non-transitory storage medium.

BACKGROUND

In an inspection of a defect such as a flaw on a surface of an inspection object, there is a case in which, instead of a visual inspection, an inspection is performed by using a photography device (optical device) that executes photography by image formation. In the inspection using the photography device, a movable body such as a robot arm is connected to the photography device (photography unit) such as a camera, and thereby the position and attitude of the photography device are made variable in accordance with the movement of the movable body. Then, the photography device is moved between a plurality of photography points by the movement of the movable body, and the surface of the inspection object are photographed at the photography points. In addition, at each of the photography points, the attitude of the photography device is adjusted to such an attitude that the angle of an optical axis of an image-forming optical system to the surface of the inspection object falls within a predetermine angle range, for example, such an attitude that the angle of the optical axis of the image-forming optical system to the surface of the inspection object becomes a right angle or a substantially right angle, and the photography device photographs the inspection object in the adjusted attitude.

In the inspection of a defect on the surface of the inspection object with use of the photography device and the movable body as described above, it is required to shorten an inspection time for inspecting a range that is an inspection target on the surface of the inspection object, for example, by shortening a movement time of the photography device between a plurality of photography points, or by shortening an adjustment time of the attitude of the photography device at each of the photography points. In other words, it is required to quickly inspect the range that is the inspection target on the surface of the inspection object.

BRIEF DESCRIPTION OF THE DRAWINGS

FIG. 3 is a schematic view illustrating an example of a configuration of a photography unit in the inspection system according to the first embodiment.

FIG. 4 is a schematic view illustrating an example of shape data of a surface of an inspection object, which is stored in a data storage unit, in a processing device according to the first embodiment.

FIG. 5 is a schematic view for describing an example of a process of setting (calculating) a plurality of photography points, the process being executed by a photography point calculator of a processing device according to the first embodiment.

DETAILED DESCRIPTION

According to an embodiment, there is provided a processing device relating to an inspection of an inspection object with use of a photography unit. The processing device includes a processor. The processor is configured to calculate a plurality of photography points as positions for photographing the inspection object by the photography unit, based on shape data in which a shape of a surface of the inspection object is indicated by a point group, and information relating to a position and a normal vector on the surface of the inspection object is defined by using the point group. The processor is configured to execute analysis regarding a path that passes through all of the calculated photography points and minimizes a sum of a movement cost from each of the photography points to a photography point that is a next movement destination, and configured to calculate a path corresponding to an analysis result as a path for moving the photography unit between the photography points.

Hereinafter, embodiments will be described with reference to the accompanying drawings.

First Embodiment

Figure 1:
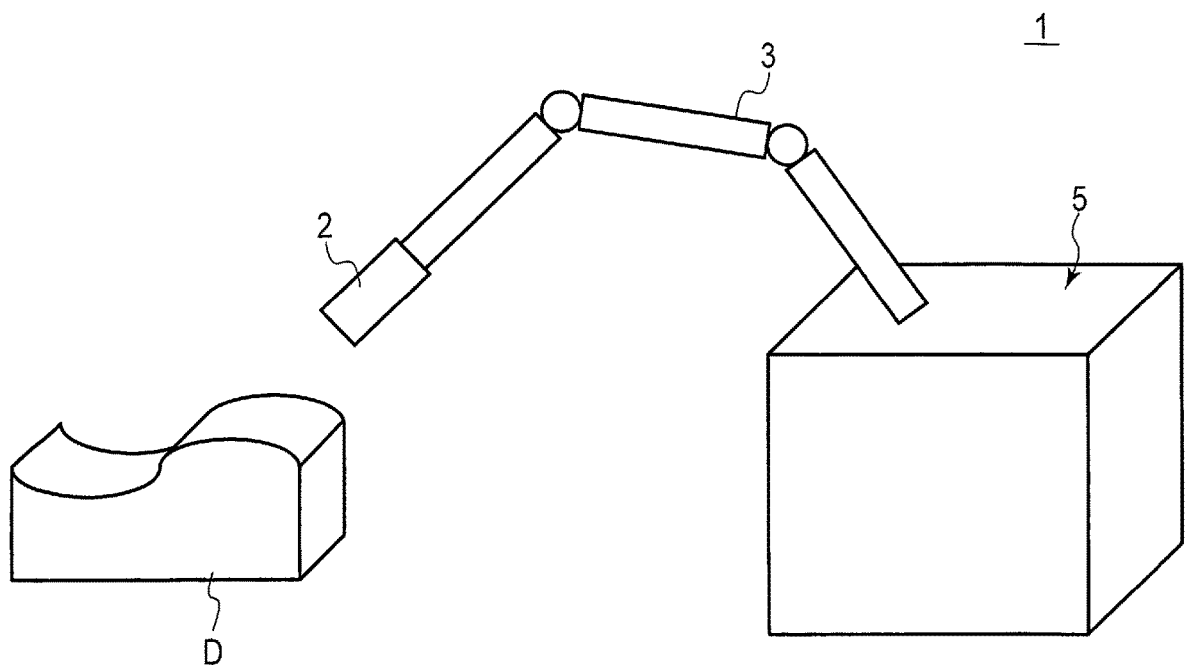
FIG. 1 is a schematic view illustrating an inspection system according to a first embodiment.
Figure 2:
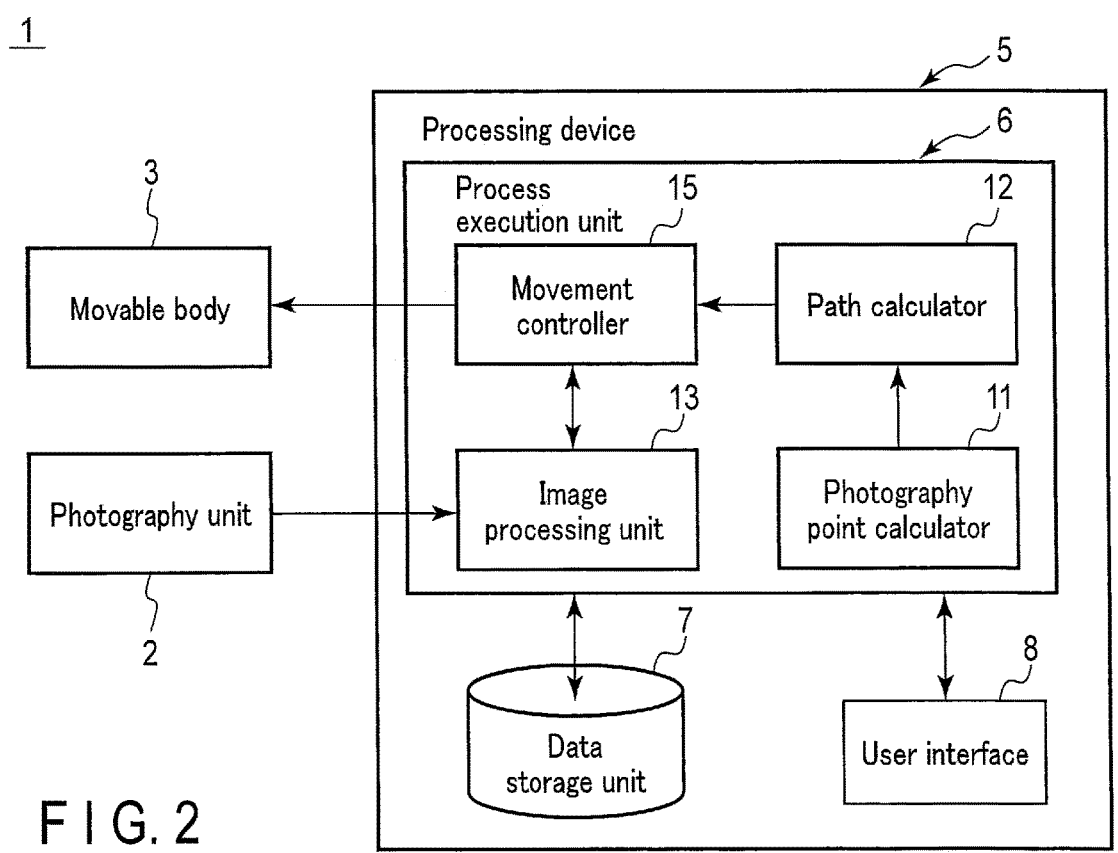
FIG. 2 is a block diagram schematically illustrating a control system and the like of the inspection system according to the first embodiment.

FIG. 1 schematically illustrates an inspection system 1 of a first embodiment, as an example of an inspection system. FIG. 2 schematically illustrates a control system and the like of the inspection system 1 of the present embodiment. As illustrated in FIG. 1 and FIG. 2, the inspection system 1 of the present embodiment is used for inspecting an inspection object D that is an inspection target. In a one-time inspection, a surface of the inspection object D is inspected by using the inspection system 1. In one example, the entirety of the surface of the inspection object D may be inspected by a one-time inspection. In another example, only a predetermined range (a part) of the surface of the inspection object D may be inspected by a one-time inspection. The inspection system 1 includes a photography unit (photography device) 2, a movable body 3 and a processing device 5. The processing device 5 includes a process execution unit 6, a data storage unit 7 and a user interface 8, and the process execution unit 6 includes a photography point calculator 11, a path calculator 12, an image processing unit 13 and a movement controller 15.

The processing device 5 is composed of, for example, a computer or the like, and includes a processor (processing circuit) and a storage medium (non-transitory storage medium). The processor includes any one of a CPU (Central Processing Unit), an ASIC (Application Specific Integrated Circuit), a microcomputer, an FPGA (Field Programmable Gate Array), a DSP (Digital Signal Processor), and the like. The storage medium may include an auxiliary storage device, in addition to a main storage device such as a memory. Examples of the storage medium include a magnetic disk, an optical disc (CD-ROM, CD-R, DVD, or the like), a magneto-optical disc (MO, or the like), and a semiconductor memory.

In the processing device 5, each of the number of processors and the number of storage media may be one or plural. In the processing device 5, the processor executes a program or the like stored in the storage medium or the like, thereby executing a process. In addition, the program that is executed by the processor of the processing device 5 may be stored in a computer (server) connected to the processing device 5 via a network such as the Internet, or may be stored in a server or the like in a cloud environment. In this case, the processor downloads the program via the network. In the processing device 5, a process (to be described later) by the process execution unit 6, which includes the photography point calculator 11, path calculator 12, image processing unit 13 and movement controller 15, is executed by the processor or the like, and the storage medium functions as the data storage unit 7.

Note that a plurality of mutually separate processing devices (computers) may be provided in the inspection system 1. In this case, each of the processing devices includes a processor and a storage medium. In addition, the process (to be described later) by the process execution unit 6 is executed by the processors of the processing devices. In one example, a process (to be described later) by the photography point calculator 11 and path calculator 12 is executed by the processor of one processing device. In addition, a process (to be described later) by the image processing unit 13 and movement controller 15 is executed by the processor of another processing device that is separate from the processing device which executes the process by the photography point calculator 11 and path calculator 12.

In addition, at least a part of the process by the process execution unit 6 may be executed by a cloud server that is constituted in a cloud environment. The infrastructure of the cloud environment is constituted by a virtual processor such as a virtual CPU, and a cloud memory. In one example, the process by the photography point calculator 11 and path calculator 12 is executed by the virtual processor, and the cloud memory functions as the data storage unit 7. Besides, the process by the image processing unit 13 and movement controller 15 is executed by the processor of a processing device such as a computer. Furthermore, the data storage unit 7 may be provided in a computer that is separate from the processing device 5 in which the process execution unit 6 is provided. In this case, the processing device 5 is connected via a network to the computer in which the data storage unit 7 and the like is provided.

Additionally, the user interface 8 includes an operation unit to which an operation instruction is input by a worker or the like in an inspection using the inspection system; and a notification unit that notifies information relating to the inspection to the worker or the like. The notification unit notifies the information by, for example, either screen display or voice, or the like. Note that the user interface 8 may be provided separately from the processing device 5.

The photography unit 2 is a photography device such as a camera. The movable body 3 is, for example, either a robot arm including one or more joints, or a linear-motion mechanism or the like. The movable body 3 is mechanically connected to the photography unit 2, and, in the example of FIG. 1 or the like, a connection portion to the photography unit 2 is formed at one end of the movable body 3. By the movement of the movable body 3, the position and attitude (posture) of the photography unit 2 are varied. Accordingly, the position and attitude of the photography unit 2 vary in accordance with the movement of the movable body 3. Here, the position of the movable body 3 is indicated, for example, a position in three dimensions.

FIG. 3 illustrates an example of a configuration of the photography unit 2. As illustrated in FIG. 3 or the like, the photography unit 2 is an optical device including an image-forming optical system 21, and executes photography by image formation by the image-forming optical system 21. The image-forming optical system 21 has an optical axis O, and is formed of, for example, one or a plurality of lenses. In addition, in the photography unit 2, an optical-axis direction along the optical axis O of the image-forming optical system is defined. Furthermore, the photography unit 2 includes an imaging element 22. In an inspection of the inspection object D, the imaging element 22 is disposed on a side opposite to the side where the inspection object D is located, with respect to the image-forming optical system 21 in the optical-axis direction.

The imaging element 22 forms an image-forming surface 23 of the image-forming optical system 21, and an image or the like of the surface of the inspection object D is formed on the image-forming surface 23 of the imaging element 22 by the image-forming optical system 21. Besides, the imaging element 22 is disposed at a greater distance from the image-forming optical system 21 than a focal position of the image-forming optical system 21, and a distance L from the image-forming optical system 21 to the imaging element 22 is greater than a focal distance f of the image-forming optical system 21.

The image-forming optical system 21 renders light from the inspection object D incident on the imaging element 22. The image-forming optical system 21 may be any one of a lens, a combination lens, a light-guide lens, a refractive index gradient lens, a reflective mirror, and the like, if the image-forming optical system forms an image of light. Accordingly, in the inspection of the inspection object D, light from the inspection object D is made incident on the image-forming surface 23 of the imaging element 22 through the image-forming optical system 21. The imaging element 22 captures an image of light that is incident on the image-forming surface 23. Thereby, in the imaging element 22, an electric signal indicative of information relating to the formed image is generated, and the inspection object D is photographed.

In the example of FIG. 3 or the like, the photography unit 2 includes a light source 25 and a mirror 26, and the light from the light source 25 is made incident on the inspection object D via the mirror 26. It should be noted, however, that the size of the mirror 26 is not particularly limited, and FIG. 3 is merely an example. Then, the light reflected by the inspection object D is made incident on the imaging element 22 by the image-forming optical system 21. In another example, light from a light source may be made incident on an inspection object by using an illumination optical system formed of one or more lenses, and the light that passes through the inspection object may be made incident on an imaging element by an image-forming optical system. The incidence on the imaging element of the light that passes through the inspection object is implemented, for example, in the same manner as in reference document 1 (Jpn. Pat. Appln. KOKAI Publication No. 2019-124542).

Besides, in the photography unit 2, a color filter 27 is disposed between the image-forming optical system 21 and the imaging element 22 in the optical-axis direction. Accordingly, the color filter 27 is disposed on the optical path of the light that is incident on the imaging element 22 through the image-forming optical system 21. The color filter 27 is disposed without being displaced, or substantially without being displaced, from the focal position of the image-forming optical system 21 in the optical-axis direction, and the distance from the image-forming optical system 21 to the color filter 27 is equal or substantially equal to the focal distance f of the image-forming optical system 21.

The color filter 27 includes one or more wavelength selection regions, and, in the example of FIG. 3, the color filter 27 includes three wavelength selection regions U1 to U3. In the example of FIG. 3, the color filter 27 is formed in rotation symmetry, or substantially in rotation symmetry, with respect to the optical axis O as the center. In addition, in the color filter 27, a wavelength selection region (first wavelength selection region) U1 is formed in a central region through which the optical axis O passes; a wavelength selection region (second wavelength selection region) U2 is formed in such a manner as to neighbor an outer peripheral side of the wavelength selection region U1; and a wavelength selection region (third wavelength selection region) U3 is formed in such a manner as to neighbor an outer peripheral side of the wavelength selection region U2. In the example of FIG. 3, an outermost periphery of the color filter 27 is formed by the wavelength selection region U3.

The wavelength selection region U1 passes only light in a first wavelength range (predetermined wavelength range). The wavelength selection region U2 passes light in a second wavelength range that is different from the first wavelength range. Besides, the wavelength selection region U3 passes light in a third wavelength range that is different from the first wavelength range and the second wavelength range. In one example, the first wavelength range agrees with, or substantially agrees with, the wavelength range of red light; the second wavelength range agrees with, or substantially agrees with, the wavelength range of green light; and the third wavelength range agrees with, or substantially agrees with, the wavelength range of blue light.

The light, which has passed through each of the wavelength selection regions U1 to U3 of the color filter 27, is incident on the imaging element 22. In addition, an electric signal, which is generated by the imaging element 22, indicates, as information relating to the formed image, information relating to the intensity of the light that is made incident on the imaging element 22 from each of the wavelength selection regions U1 to U3, i.e. information relating to an incidence intensity on the imaging element 22 in regard to the light of each of the first wavelength range to the third wavelength range. Accordingly, in the present embodiment, the electric signal generated by the imaging element 22 is indicative of the information relating to the incidence intensity on the imaging element 22 in regard to the light of each of one or more wavelength ranges.

In addition, in the configuration in which the light that has passed through the inspection object is rendered incident on the imaging element, a first color filter may be provided between the inspection object and the imaging element, as described above, and a second color filter may be provided between the light source and the inspection object. In this case, like reference document 1, the first color filter and the second color filter are disposed, and, like reference document 1, wavelength selection regions are formed in each of the two color filters. In one example, in each of the two color filters, a wavelength selection region is formed in at least the central region. In addition, the wavelength of light, which is passed through each of the wavelength selection regions of the two color filters, is defined in such a state that the light that can pass through the central region of the first color filter cannot pass through the central region of the second color filter, and the light that can pass through the central region of the second color filter cannot pass through the central region of the first color filter.

As described above, in the present embodiment, the color filter is disposed on the optical path of the light that is made incident on the imaging element 22 from the inspection object D, for example, by providing the color filter 27 or the above-described first color filter. In addition, a color filter may be provide on the optical path of the light that is made incident on the inspection object D from the light source, for example, by providing the above-described second color filter. Additionally, in the present embodiment, a wavelength selection region for passing only the light in a predetermined wavelength range is formed in each of the color filters. Besides, in one or more of the color filters, a plurality of wavelength selection regions may be formed. In this case, in the wavelength selection regions, the wavelength ranges of the light that is passed are different from each other. It should be noted, however, that the wavelength ranges may include a mutually overlapping portion. In addition, in one or more of the color filters, at least one of a region that passes light of all wavelengths, and a region that does not pass light of any wavelength, may be formed in addition to one or more wavelength selection regions.

The movable body 3 moves by an actuator being operated. The movement controller 15 controls the movement of the movable body 3 by controlling the operation of the actuator that moves the movable body 3. By the movement of the movable body 3 being controlled by the movement controller 15, the position and attitude (posture) of the connection portion of the movable body 3 to the photography unit 2 are adjusted. In addition, by the position and attitude of the connection portion of the movable body 3 to the photography unit 2 being adjusted, the position and attitude of the photography unit 2 are adjusted. In the state in which the inspection object D is being photographed by the photography unit 2, the movement controller 15 controls the attitude of the photography unit 2 in such a state that the angle of the optical axis O of the image-forming optical system 21 to the surface of the inspection object D falls within a predetermined angle range. In the example of FIG. 3 or the like, in the photography of the inspection object D, the attitude of the photography unit 2 is adjusted in such a state that the angle of the optical axis O of the image-forming optical system 21 to the surface of the inspection object D becomes a right angle or a substantially right angle.

An electric signal that is generated by the imaging element 22 is input to the image processing unit 13. Thus, in the state in which photography is being executed by the photography unit 2, the image processing unit 13 acquires information relating to an image formed by the imaging element 22, and acquires, for example, information relating to the intensity of light that travels from the inspection object D through each of one or more wavelength selection regions U1 to U3 of the color filter 27, and is made incident on the imaging electrode 22. In addition, based on the electric signal from the imaging element 22, the image processing unit 13 generates a photography image by the photography unit 22, as an image of a photography range of the photography unit 2. Then, the image processing unit 13 executes an arithmetic operation and determination, and the like, which are based on the photography image, by image-processing the image photographed by the photography unit 2.

In the example of FIG. 3 or the like, by the electric signal being input to the image processing unit 13, the image processing unit 13 acquires the information relating to the intensity of the light that is made incident on the imaging element 22 from each of the wavelength selection regions U1 to U3. Then, based on the information relating to the intensity of the light that is made incident on the imaging element 22 from each of the wavelength selection regions U1 to U3, the image processing unit 13 calculates information relating to diffuse reflection on the surface of the inspection object D. Then, based on the information relating to the diffuse reflection on the surface of the inspection object D, the image processing unit 13 calculates information relating to the shape of the surface of the inspection object D, including the unevenness state of the surface of the inspection object D. Furthermore, based on the information relating to the diffuse reflection on the surface of the inspection object D, the image processing unit 13 may calculate information relating to scattering of light on the inspection object D. In the example of FIG. 3 or the like, based on the information relating to the shape of the surface of the inspection object D, the image processing unit 13 determines the state of the surface of the inspection object D. In the determination of the state of the surface of the inspection object D, the image processing unit 13 executes, for example, determination regarding a defect such as a flaw on the surface of the inspection object D. Thereby, the presence or absence of a defect on the surface of the inspection object D is determined.

In addition, in one example, as described above, light is made incident on an inspection object through the second color filter, and the light passing through the inspection object is made incident on the imaging element 22 through the first color filter. Then, by the electric signal being input to the image processing unit 13, the image processing unit 13 acquires the information relating to the intensity of light that is made incident on the imaging electrode 22 from each of one or more wavelength selection regions of the first color filter. Further, based on the information relating to the intensity of the light that is made incident on the imaging electrode 22 from each of the one or more wavelength selection regions, the image processing unit 13 calculates information relating to an angle of deviation of light on the inspection object. The information relating to the angle of deviation of light on the inspection object is calculated in the same manner as in reference document 1. Then, based on the information relating to the angle of deviation of light on the inspection object, the image processing unit 13 calculates information relating to the shape of the surface of the inspection object, and executes determination or the like in regard to a defect on the surface of the inspection object.

In the inspection using the inspection system 1, the photography unit 2 executes photography at a plurality of mutually different photography points (photography positions) in the inspection range of the surface of the inspection object D. In addition, the image processing unit 13 executes determination regarding a defect or the like on the surface of the inspection object D, for example, by image-processing the images photographed at the photography points. Furthermore, by controlling the movement of the movable body 3 as described above, the movement controller 15 varies the position and attitude of the photography unit 2, and moves the photography unit 2 between a plurality of photography points.

The photography point calculator 11 calculates the above-described plurality of photography points as positions at which the inspection object D is photographed by the photography unit 2 in the inspection. Based on the shape data of the surface of the inspection object D, which is stored in the data storage unit 7 or the like, the photography point calculator 11 calculates the photography points. In the shape data, the shape, such as a three-dimensional shape, of the surface of the inspection object D is indicated by a point group composed of many points. In addition, in the shape data, information relating to positions and normal vectors on the surface of the inspection object D is defined by using the point group. The photography point calculator 11 calculates the photography points in such a state that, for example, when all photography points were photographed by the photography unit 2, any part of the inspection range of the surface of the inspection object D is photographed by photography at any one or more of the photography points. Besides, the photography range (view angle) of the photography unit 2 may be fixed for all photography points, or may be varied for each photography point.

FIG. 4 illustrates an example of the shape data of the surface of the inspection object D. In the example of FIG. 4, the shape data is indicated by an STL (standard triangulated language) format. In the shape data of the example of FIG. 4, the shape of the surface of the inspection object D is indicated by a point group composed of many points P. In addition, in the shape data of the example of FIG. 4, the surface of the inspection object D is divided into many triangles T, based on the point group. In each of many triangles T, the corresponding three points P of the points P constituting the point group become the vertices. In the shape data of the example of FIG. 4, positions, such as three-dimensional positions, of the points P constituting the point group are indicated as information relating to positions on the surface of the inspection object D. In addition, in the shape data, normal vectors of the many triangles T are indicated as information relating to positions on the surface of the inspection object D.

Here, the normal vector is orthogonal to the surface of the inspection object D, and is directed toward the outside of the inspection object D. In FIG. 4, the illustration of the normal vector is omitted. In addition, in the shape data, the surface of the inspection object D may be divided into a plurality of (many) polygons other than triangles, for example, such that the surface of the inspection object D is divided into many rectangles. Also in this case, the vertices of each polygon are formed of four or more corresponding points P of the points P that constitute the point group, and, in the shape data, normal vectors of the polygons are indicated as information relating to positions on the surface of the inspection object D.

The photography point calculator 11 reads out the above-described shape data from the data storage unit 7. Then, based on the shape data, the photography point calculator 11 acquires information relating to the shape of the surface of the inspection object D in the inspection range. In addition, based on the information stored in the data storage unit 7, and the information or the like, which is set in the user interface 8, the photography point calculator 11 acquires information relating to the photography unit 2 and the movable body 3, including the area that the photography unit 2 can photograph, the distance between the photography unit 2 and the inspection object D, the resolution of the photography unit 2, and the position where the photography unit 2 and the movable body 3 can be disposed. Based on the shape data and the information relating to the photography unit 2 and the movable body 3, the photography point calculator 11 calculates a plurality of photography points at which photography is executed in the inspection range.

For example, as described above, it is assumed that, in the shape data, the surface of the inspection object D is divided into polygons, such as triangles T, based on the point group. In this case, the photography points are calculated in such a state that, in each of the polygons (triangles T) disposed in the inspection range of the surface of the inspection object D, any part of each polygon is included in the photography range of photography at one or more of the photography points. In other words, the photography points are calculated in such a state that, in each of the polygons (triangles T) disposed in the inspection range of the surface of the inspection object D, any part of each polygon is photographed by photography at one or more of the photography points. Note that a part of the photography range of photography at each of the photography points may overlap a part of the photography range of photography at another photography point.

FIG. 5 is a view for describing an example of a process of setting (calculating) a plurality of photography points. In the example of FIG. 5, at least three photography points Fa to Fc are calculated as photography points F from a preset inspection range. In addition, a photography range Ra of photography at the photography point Fa, a photography range Rb of photography at the photography point Fb, and a photography range Rc of photography at the photography point Fc are defined. Furthermore, in the example of FIG. 5, a triangle Ta that is one of triangles T disposed in the inspection range is illustrated, and any part of the triangle Ta is included in any one or more of the photography ranges Ra to Rc. Thus, the photography points F are calculated in such a state that any part of the triangle Ta is photographed by photography at any one or more of the photography points Fa to Fc. Besides, as regards each of the triangles T, other than the triangle Ta, which are disposed in the inspection range, the photography points F are calculated in such a state that any part of each of the triangles T is photographed by photography at one or more of the photography points F.

Besides, in the example of FIG. 5, in the calculation of the photography points Fa to Fc, the triangle Ta is divided into three polygons. In addition, the triangle Ta is divided in such a state that each of the three polygons includes a corresponding one of the photography points Fa to Fc. Furthermore, the triangle Ta is divided in such a state that the center of gravity of each of the three polygons agrees with, or substantially agrees with, a corresponding one of the photography points Fa to Fc. Thereby, one center of gravity corresponding to each of the three polygons divided from the triangle Ta is calculated as each of the photography points Fa to Fc. When the center of gravity of each of the divided polygons is calculated as one corresponding photography point, each of the photography points is calculated by using a centroid Voronoi tessellation method, or a well-known rectangle partition method, or the like.

In addition, in the inspection range of the inspection object D, there is a case in which there exists a small-angular-difference portion at which an angular difference on the surface of the inspection object D between mutually neighboring triangles T is small or zero. Here, in the state in which the inspection object D is being photographed by the photography unit 2, the angle of the optical axis O of the image-forming optical system 21 to the surface of the inspection object D is adjusted in the predetermined angle range as described above. The angular difference between the mutually neighboring triangles T in the small-angular-difference portion is equal to or less than an angle width of the above-described predetermined angle range. In the small-angular-difference portion, the angular difference between the mutually neighboring triangles T is, for example, several degrees, even if the angular difference is not zero. In this case, in the small-angular-difference portion, for example, the angular difference on the surface of the inspection object D between the mutually neighboring triangles T is smaller than the magnitude of the above-described predetermined angle range in regard to the angle of the optical axis O of the image-forming optical system 21 to the surface of the inspection object D. In addition, when the small-angular-difference portion exists in the inspection range, a plurality of calculation points are calculated on the assumption that a plurality of triangles (polygons) that are disposed in the small-angular-difference portion are located on an identical plane to each other. In one example, one or more of photography points are calculated and set, based on one polygon that is formed of a plurality of triangles T disposed in the small-angular-difference portion. In addition, in one polygon formed of a plurality of triangles T disposed in the small-angular-difference portion, the photography points are calculated in such a state that any part of the polygon is included in the photography range of photography at one or more of the photography points.

Figure 6:
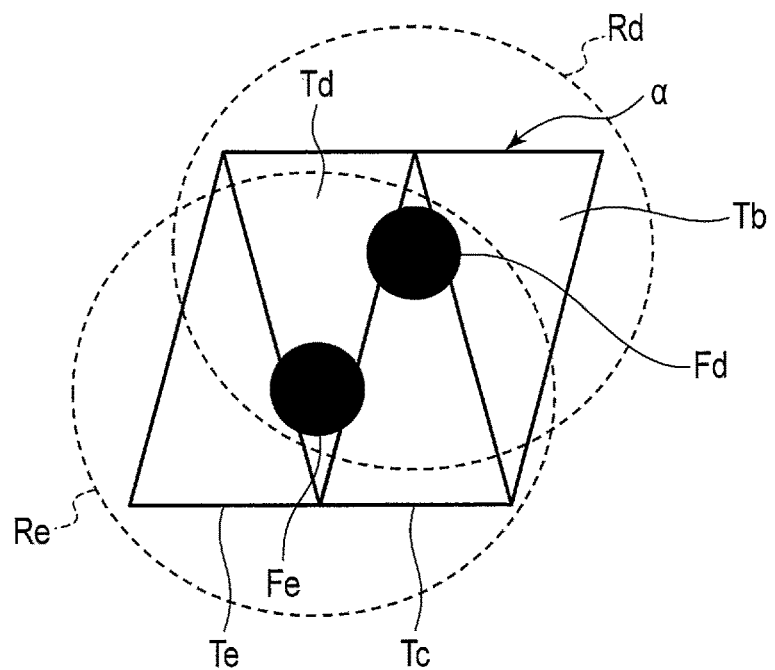
FIG. 6 is a schematic view for describing an example of a process of setting (calculating) one or more of photography points, based on one polygon formed of a plurality of triangles disposed in a small-angular-difference portion, the process being executed by the photography point calculator of the processing device according to the first embodiment.

FIG. 6 is a view for describing an example of a process of setting (calculating) one or more of photography points, based on one polygon formed of a plurality of triangles T disposed in a small-angular-difference portion. In the example of FIG. 6, four triangles Tb to Te are disposed in a small-angular-difference portion, and the angular difference on the surface of the inspection object D between the triangles Tb to Te with respect to each other is small or zero. In addition, a polygon α is formed of the triangles Tb to Te disposed in the small-angular-difference portion. Besides, in the example of FIG. 6, at least two photography points Fd and Fe are calculated as the photography points F, and the photography point calculator 11 sets the photography points Fd and Fe, based on the polygon α. Then, a photography range Rd of photography at the photography point Fd, and a photography range Re of photography at the photography point Fe are defined.

In the example of FIG. 6, any part of the polygon α formed of the triangles Tb to Te is included in at least one of the photography ranges Rd and Re. Thus, the photography points F are calculated in such a state that any part of the polygon α is photographed by photography at any one or more of the photography points Fd and Fe. In addition, in the example of FIG. 6, in the calculation of the photography points Fd and Fe, the polygon α is divided into two polygons. Furthermore, the polygon α is divided in such a state that each of the two polygons includes a corresponding one of the photography points Fd and Fe. Then, like the calculation of the above-described photography points Fa to Fc, one corresponding center of gravity of each of the two polygons divided from the polygon α is calculated as each of the photography points Fd and Fe.

The photography point calculator 11 calculates a position on the surface of the inspection object D in regard to each of the photography points. In addition, the photography point calculator 11 calculates a direction of photography of the inspection object D in regard to each of the photography points. In regard to each of the photography points, the direction of photography of the inspection object D (the attitude of the optical axis O of the image-forming optical system 21) is calculated based on the angle of the surface of the inspection object D, and a predetermined angle range in regard to the angle of the optical axis O of the image-forming optical system 21 to the surface of the inspection object D.

Figure 7:
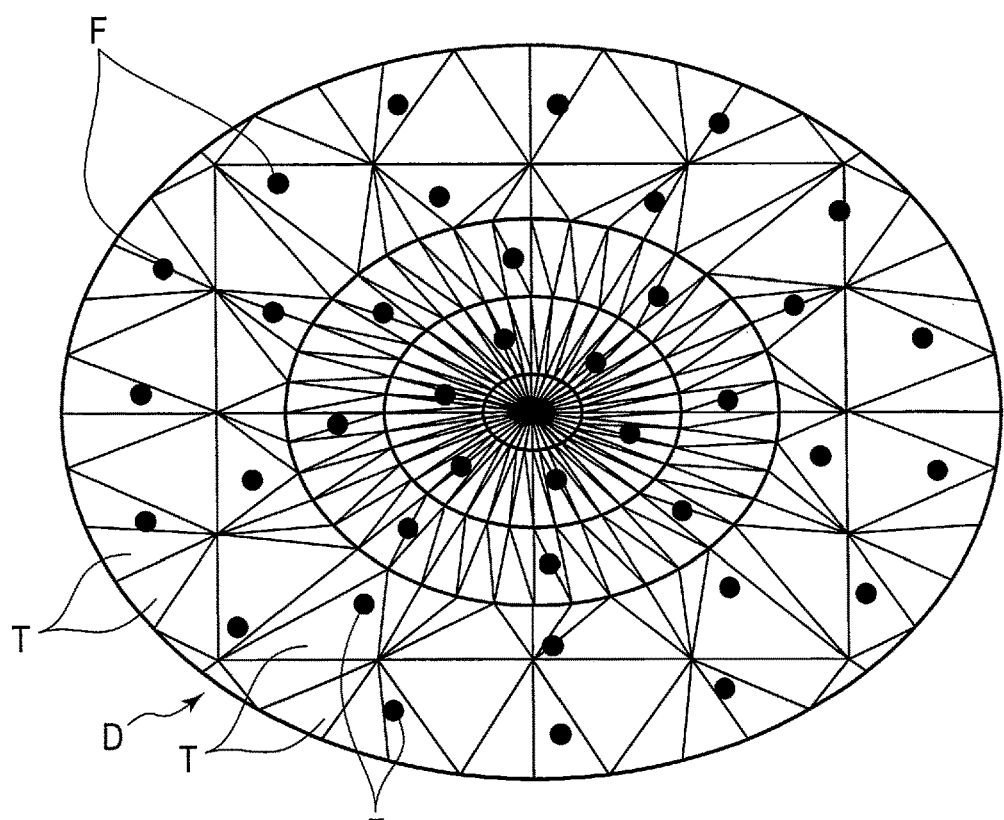
FIG. 7 is a schematic view illustrating an example of a plurality of photography points, which the photography point calculator of the processing device according to the first embodiment calculates by using the shape data of the example of FIG. 4.

FIG. 7 illustrates an example of a plurality of photography points F calculated by using the shape data of the example of FIG. 4. In the example of FIG. 7, the photography points F are calculated as described above, by using the shape data in which the surface of the inspection object D is divided into many triangles T. Then, in regard to each of the photography points F, the position on the surface of the inspection object D and the direction of photography of the inspection object D are calculated.

The path calculator 12 acquires the information relating to the photography points F calculated by the photography point calculator 11. The path calculator 12 calculates the position and attitude of the photography unit 2, based on the position on the surface of the inspection object D and the direction of photography of the inspection object D in regard to each of the photography points F. In addition, the path calculator 12 calculates the position and attitude of the connection portion of the movable body 3 to the photography unit 2, and the control amount of the movable body 3, based on the calculated position and attitude, or the like, of the photography unit 2 in regard to each of the photography points F. Here, when a robot arm including one or more joints functions as the movable body 3, an example of the control amount of the movable body 3 is the angle or the like of each joint. Besides, when a linear-motion mechanism functions as the movable body 3, an example of the control amount of the movable body 3 is the movement amount by the movement of the linear-motion mechanism.

The path calculator 12 calculates a path for moving the photography unit 2 between the photography points F in the inspection of the inspection object D in the inspection range. In the calculation of the movement path of the photography unit 2, a path, which passes through all of the photography points F in the inspection range, is calculated. In addition, a path, which successively passes through the photography points F one by one and passes through each of the photography points F only once, is calculated as a movement path of the photography unit 2. Furthermore, the path calculator 12 calculates the movement path of the photography unit 2, based on a movement cost c from each of the photography points F to a photography point F that is the next movement destination. Note that the calculated movement path of the photography unit 2 may be a circuit (closed path) in which the photography point that is the start point is identical to the photography point that is the end point, or may be a path in which the photography point that is the start point is different from the photography point that is the end point.

In the calculation of the movement path of the photography unit 2, the path calculator 12 executes analysis regarding a path that passes through all photography points F and that minimizes the sum of the movement cost c from each of the photography points F to a photography point F that is the next movement destination. In other words, the path calculator 12 analyzes an optimization problem relating to a path that passes through all photography points F and that minimizes the sum of the movement cost c. Then, the path calculator 12 calculates the path corresponding to the analysis result of the optimization problem, as the path for moving the photography unit 2 between the photography points F.

In addition, the movement cost c from each of the photography points F to a photography point F that is the next movement destination is calculated based on a variation between two target photography points F in regard to at least one of the position of the photography unit 2, the attitude of the photography unit 2, the position of the connection portion of the movable body 3 to the photography unit 2, the attitude of the connection portion of the movable body 3 to the photography unit 2, and the control amount of the movable body 3. In the calculation of the movement cost c, use may be made of the variation between the two target photography points F of all of the above-described parameters, or use may be made of the variation between the two target photography points F of a part of the above-described parameters. Moreover, the movement cost c may be calculated by adding a weight corresponding to an importance degree to each of the above-described parameters.

In one example, the path calculator 12 calculates a path of the photography unit 2, which passes through all of an n-number of photography points F1 to Fn that are calculated. In addition, in the calculation of the path of the photography unit 2, the path calculator 12 analyzes an optimization problem (minimization problem) for minimizing a parameter H indicated by equation (1). Besides, in the optimization problem, a condition indicated by equation (2) and a condition indicated by equation (3) are constraint conditions. Then, a path corresponding to the analysis result of the optimization problem is calculated as the path for moving the photography unit 2 between the photography points F1 to Fn.

$$H = \frac{1}{2}\sum_{i=1}^{n}\sum_{j=1}^{n}\sum_{k=1}^{n} c_{ij} n_{k,i}(n_{k+1,j} + n_{k-1,j}) \tag{1}$$

$$\sum_{k=1}^{n} n_{k,i} = 1 (i = 1, 2, \ldots, n) \tag{2}$$

$$\sum_{i=1}^{n} n_{k,i} = 1 (k = 1, 2, \ldots, n) \quad (3)$$

Here, in equations (1) to (3), $c_{ij}$ indicates a movement cost between photography points Fi and Fj. In addition, $n_{k,i}$ is a parameter indicative of the order of the path, and this parameter is 1 when the path passes through the photography point Fi as a k-th photography point among all photography points F1 to Fn, and is 0 in other cases. In the condition indicated by equation (2), such a constraint is imposed that there is only one photography point at which the parameter $n_{k,i}$ is 1, when k becomes each of 1 to n. In other words, such a constraint is imposed that, in the movement path of the photography unit 2, the photography unit 2 passes through only one photography point as the k-th photography point, and such a constraint is imposed that the photography unit 2 successively passes through the photography points F1 to Fn one by one.

In addition, in the condition indicated by equation (3), such a constraint is imposed that when i becomes each of 1 to n, there is only one order in which the parameter $n_{k,i}$ is 1. In other words, such a constraint is imposed that each of the photography points F1 to Fn is passed only once. Note that when a circuit, in which the photography point that is the start point is identical to the photography point that is the end point, is calculated as the movement path of the photography unit 2, $n_{0,i}=n_{n,i}$ is satisfied, and $n_{1,i}=n_{n+1,i}$ is satisfied. On the other hand, when a path, in which the photography point that is the start point is different from the photography point that is the end point, is calculated as the movement path of the photography unit 2, $n_{0,i}=0$ is satisfied, and $n_{n+1,i}=0$ is satisfied.

In addition, in one example, in the calculation of the path of the photography unit 2, instead of the parameter H indicated by equation (1), use may be made of a parameter Ha in which elements of the constraint conditions indicated by equation (2) and equation (3) are included in the parameter H. In this case, the parameter Ha is calculated as expressed in equation (4). In an evaluation function for calculating the parameter Ha indicated by equation (4), the constraint conditions indicated by equation (2) and equation (3) are included as a penalty function. In addition, in equation (4), $A_1$ and $A_2$ are parameters indicative of weights. In the present example, the path calculator 12 analyzes, in the calculation of the path of the photography unit 2, an optimization problem (minimization problem) for minimizing the parameter Ha indicated by equation (4). Then, a path corresponding to the analysis result of the optimization problem is calculated as the path for moving the photography unit 2 between the photography points F1 to Fn.

$$HA = \frac{1}{2}\sum_{i=1}^{n}\sum_{j=1}^{n}\sum_{k=1}^{n} c_{ij} n_{k,i}(n_{k+1,j} + n_{k-1,j}) + \\ A_1 \sum_{i}^{n}\left(\sum_{k}^{n} n_{k,i} - 1\right)^2 + A_2 \sum_{k}^{n}\left(\sum_{i}^{n} n_{k,i} - 1\right)^2 \quad (4)$$

In addition, in one example, a movement cost $c_{ij}$ between photography points Fi and Fj is calculated as expressed in equation (5). In equation (5), a subscript "i" is added to a parameter relating to the photography point Fi, and a subscript "j" is added to a parameter relating to the photography point Fj. In addition, in equation (5), in regard to each of the photography points Fi and Fj, a vector (position vector) indicative of the position of the photography unit 2 is p, a vector indicative of the attitude (attitude of optical axis O) of the photography unit 2 is a, a vector (position vector) indicative of the position of the connection portion of the movable body 3 to the photography unit 2 is y, a vector indicative of the attitude of the connection portion of the movable body 3 to the photography unit 2 is b, and a vector indicative of the control amount of the movable body 3 is q.

$$c_{ij} = z_1\|p_i - p_j\|_2 + z_2\|a_i - a_j\|_2 + z_3\|y_i - y_j\|_2 + z_4\|b_i - b_j\|_2 + z_5\|q_i - q_j\|_2 \quad (5)$$

In addition, in equation (5), each of $z_1$ to $z_5$ is a parameter indicative of a weight, and is a real number of 0 or more. A difference amount of each of the vectors p, a, v, b and q between the two photography points Fi and Fj is weighted by a corresponding one of the parameters $z_1$ to $z_5$. In addition, when a part of the parameters $z_1$ to $z_5$ is 0, a difference amount between the photography points Fi and Fj is ignored in regard to the vector (one of p, a, v, b and q) corresponding to the parameter (one of $z_1$ to $z_5$) that is 0, and the movement cost $c_{ij}$ is calculated.

Additionally, in one example, in the analysis of the above-described optimization problem (minimization problem) for minimizing the sum of the movement cost, a parameter β relating to the order of passage through the photography points is set, and one of the above-described parameters H and Ha is indicated as the function of the parameter β. In this case, in the analysis of the optimization problem, for example, the value of the parameter β for minimizing the function H(β) is analyzed.

Additionally, if the number of photography points F through which the photography unit 2 passes while moving, i.e. if n in equation (1) or the like increases, there is a possibility that an optimal solution of the above-described optimization problem for minimizing the sum of the movement cost cannot be derived in a polynomial time. Thus, as regards the path for moving the photography unit 2 between the photography points, it is not always necessary to calculate the optimal solution of the above-described optimization problem for minimizing the sum of the movement cost, and either a local optimal solution or an approximate solution of the optimization problem may be calculated.

Figure 8:
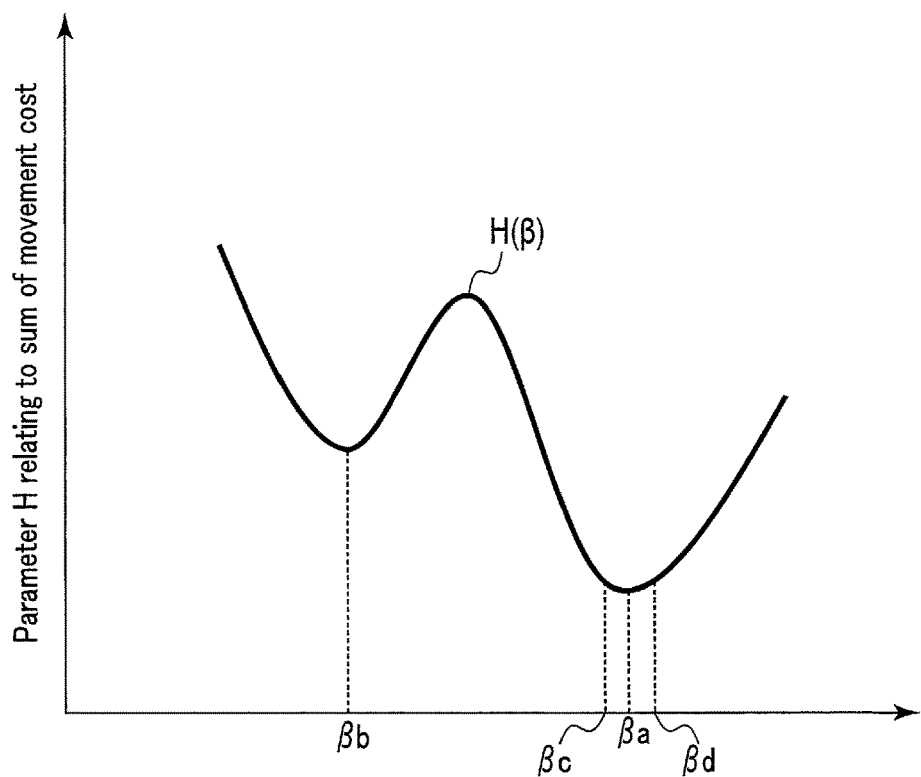
FIG. 8 is a schematic view illustrating an example of a relationship between a parameter relating to an order of passage through photography points and a parameter relating to a sum of a movement cost, the relationship being used for the calculation of a movement path of the photography unit by a path calculator of the processing device according to the first embodiment.

FIG. 8 illustrates an example of the relationship between the parameter β relating to the order of passage through photography points and the above-described parameter H relating to the sum of the movement cost. In the example of FIG. 8, the parameter H is indicated as a function H(β) in which the parameter β is a variable. In addition, in FIG. 8, the abscissa axis indicates the parameter β, and the ordinate axis indicates the parameter H. In the example of FIG. 8, an optimization problem for minimizing the function H(β) is analyzed as the above-described optimization problem for minimizing the sum of the movement cost. In addition, a value βa becomes an optimal solution of the optimization problem. Besides, a value βb becomes a local optimal solution of the optimization problem. Furthermore, a value slightly deviating from the value sa becomes an approximate solution of the optimization problem, and, for example, values βc and βd become approximate solutions of the optimization problem. In the example of FIG. 8, a path corresponding to the value βa may be calculated as the path for moving the photography unit 2, or a path corresponding to any one of the values βb, βc and βd may be calculated as the path for moving the photography unit 2.

Additionally, the optimization problem relating to the path for minimizing the sum of the movement cost may be converted to an Ising model, and analysis and calculation may be executed in regard to the path for moving the photography unit 2. In this case, in the Ising model, analysis is executed in regard to the direction of each of spins for minimizing the energy of a spin system. In addition, in the analysis of the optimization problem in regard to the path for minimizing the sum of the movement cost, use may be made of a heuristic algorithm such as a genetic algorithm (GA) or simulated annealing (SA).

Figure 9:
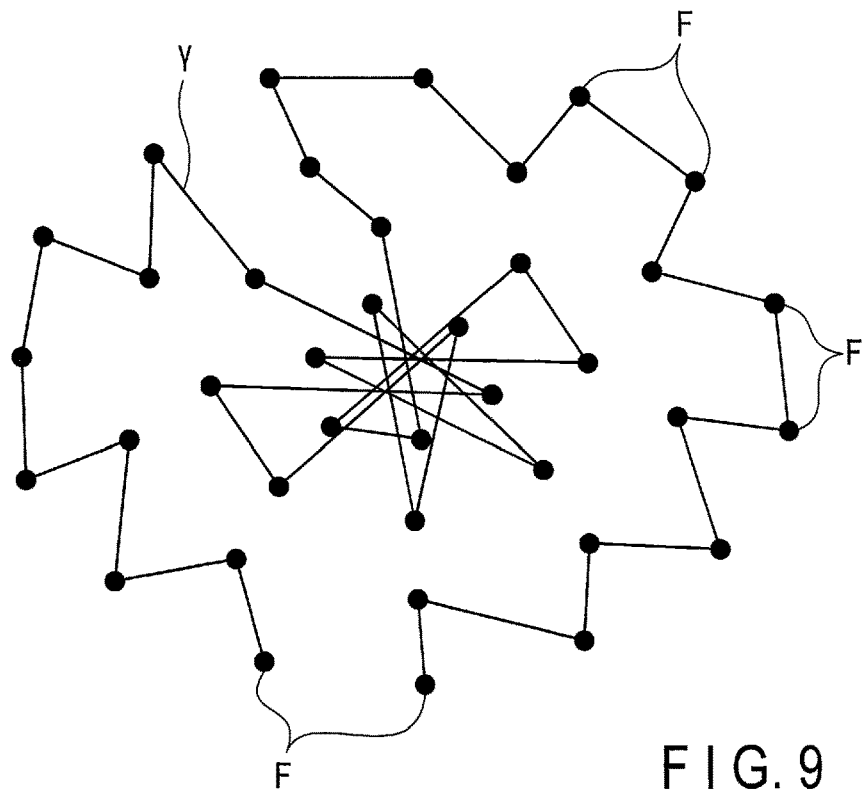
FIG. 9 is a schematic view illustrating an example of a path for moving the photography unit, the path being calculated by the path calculator of the processing device according to the first embodiment, based on the photography points of the example of FIG. 7.

FIG. 9 illustrates an example of a path γ for moving the photography unit 2, the path γ being calculated based on the photography points F of the example of FIG. 7. In the example of FIG. 9, a path γ is calculated as a path that successively passes through all photography points F one by one and passes through each of all photography points F only once. In addition, in the example of FIG. 9, too, analysis regarding the path for minimizing the sum of the movement cost is executed as described above, and the path γ is calculated as the path corresponding to the analysis result.

The movement controller 16 acquires the path calculated by the path calculator 12 as the path for moving the photography unit 2. Then, based on the calculated path, the movement controller 16 controls the movement of the movable body 3, and moves the photography unit along the calculated path. Then, by controlling the movement of the movable body 3, the movement controller 16 adjusts the photography unit 2 in the attitude calculated by the photography point calculator 11 at each of the photography points. In addition, at each of the photography points, the photography unit 2 photographs the surface of the inspection object D in the adjusted attitude. Then, the image processing unit 13 image-processes the image photographed at each of the photography points, and executes the above-described determination or the like in regard to a defect on the surface of the inspection object D, based on the photographed image.

In one example, when the image processing unit 13 determines that a defect is present on the surface of the inspection object D, the process execution unit 6 including the image processing unit 13 causes the display screen or the like, which is provided in the user interface 8, to display an image indicative of the defect that was determined to be present on the surface of the inspection object D. In addition, in one example, the image processing unit 13 or the like reflects, on the shape data, the determination result of the defect on the surface of the inspection object D, and causes the display screen or the like of the user interface 8 to display an image in which the determination result of the defect is reflected on the shape data. In this case, the image, in which the defect is reflected on the shape data, is displayed in the state in which the defect that was determined to be present on the surface of the inspection object D is indicated at a corresponding position of the shape data.

Figure 10:
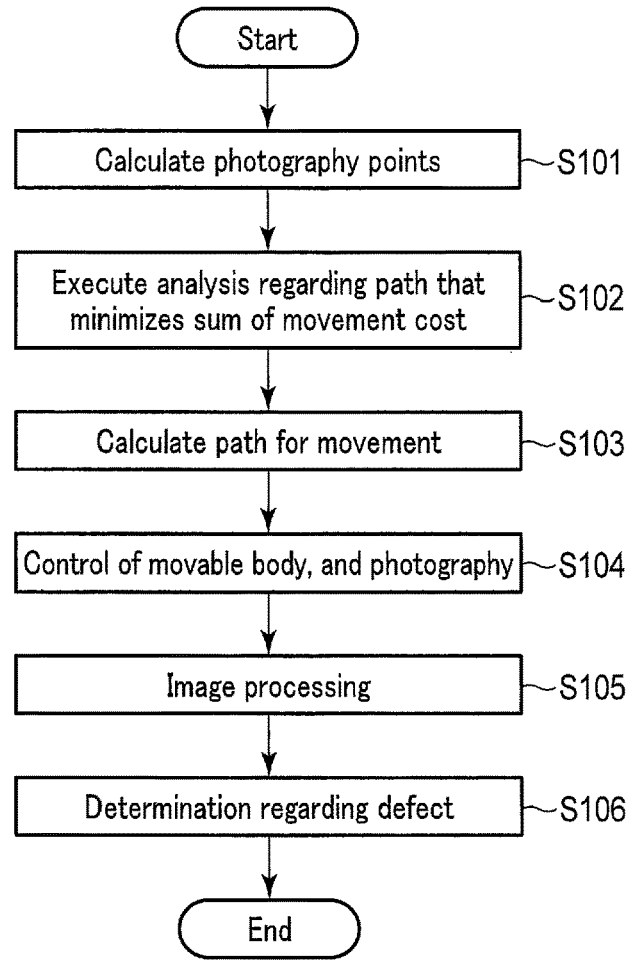
FIG. 10 is a flowchart schematically illustrating an example of a process executed by a process execution unit of the processing device according to the first embodiment.

FIG. 10 illustrates an example of a process executed by the process execution unit 6 of the processing device 5 according to the present embodiment. The process of FIG. 10 is executed each time an inspection of the inspection object D or the like is once executed. If the process of FIG. 10 is started, the photography point calculator 11 calculates photography points F as described above, based on the shape data of the inspection object D (S101). Then, the path calculator 12 executes analysis, as described above, in regard to the path that passes through all calculated photography points F and that minimizes the sum of the movement cost c from each of the photography points F to a photography point F that is the next movement destination (S102). Then, the path calculator 12 calculates the path corresponding to the analysis result of the path that minimizes the sum of the movement cost c, as the path for moving the photography unit 2 between the photography points F (S103).

Then, the movement controller 15 controls the movement of the movable body 3, based on the photography points F and the calculation result of the path for moving the photography unit 2 (S104). Thereby, the photography unit 2 moves along the calculated path, and the attitude or the like of the photography unit 2 is adjusted at each of the photography points F. In addition, in the state in which the photography unit 2 is moving along the calculated path, the process execution unit 6 including the image processing unit 13 or the like causes the photography unit 2 to photograph the surface of the inspection object D at each of the photography points F (S104). Then, the image processing unit 13 image-processes the image photographed at each of the photography points F (S105). Subsequently, the image processing unit 13 executes determination, as described above, in regard to a defect or the like on the surface of the inspection object D, based on the image or the like photographed at each of the photography points F (S106).

In one example, the process of S104 to S106 is repeatedly executed each time photography at one photography point F is executed. In addition, in another example, after photography is executed at all photography points F, the image processing of S105 and the determination process of S106 are executed.

As described above, in the present embodiment, an analysis is executed in regard to the path that passes through all photography points and that minimizes the sum of the movement cost c from each of the photography points to a photography point that is the next movement destination. Then, the path corresponding to the analysis result relating to the path is calculated as the path for moving the photography unit 2 between the photography points. Thus, in the inspection of inspecting a defect or the like on the surface of the inspection object D, based on the images photographed at the photography points, the range of the inspection target on the surface of the inspection object D can quickly be inspected by moving the photography unit 2 along the path calculated as described above.

Furthermore, since the path for moving the photography unit 2 is calculated as described above, it is not necessary for a worker or the like to input, in the inspection, an instruction relating to the movement of the photography unit 2 through the user interface 8 or the like. In addition, in the present embodiment, the direction of photography of the inspection object D is calculated in regard to each of the photography points. Besides, based on the direction of photography of the inspection object D, the attitude of the photography unit 2 is calculated in regard to each of the photography points. In the inspection of the inspection object D, the surface of the inspection object D is photographed in the state in which the photography unit 2 is adjusted in the calculated attitude at each of the photography points. Accordingly, photography is properly executed at each photography point, and an inspection is properly executed, in the case where the surface of the inspection object D has a curved shape, as well as in the case where the surface of the inspection object D has a planar shape.

Additionally, the movement cost c from each of the photography points to a photography point that is the next movement destination is calculated based on a variation of at least one of the position of the photography unit 2, the attitude of the photography unit 2, the position of the connection portion of the movable body 3 to the photography unit 2, the attitude of the connection portion of the movable body 3 to the photography unit 2, and the control amount of the movable body 3. Thus, since the path for moving the photography unit 2 is calculated based on the sum of the movement cost c, the movement path of the photography unit 2 is calculated by taking into account the adjustment time of the attitude of the photography unit 2 at each of the photography points, in addition to the movement time of the photography unit 2 between the photography points. Accordingly, in the inspection, by moving the photography unit 2 along the calculated path, the movement time of the photography unit 2 between the photography points can be shortened, and the adjustment time of the attitude of the photography unit 2 at each of the photography points can also be shortened.

Additionally, in the above-described analysis in regard to the path for minimizing the sum of the movement cost c, the constraint condition is that the photography points are successively passed one by one, and each of the photography points is passed only once. Thus, it is possible to effectively prevent a path or the like, in which one photography point is passed multiple times, from being calculated as the movement path of the photography unit 2, and a path that is appropriate as the path for moving the photography unit 2 is calculated.

Additionally, in the present embodiment, as the path for moving the photography unit 2, any one of the optimal solution, local optimal solution and approximate solution of the above-described optimization problem is calculated in regard to the path that passes through all photography points and that minimizes the sum of the movement cost c. Accordingly, even when an optimal solution cannot be derived during a necessary processing time for the analysis of the optimization problem (the calculation of the movement path), a local optimal solution or an approximate solution of the optimization problem is calculated as the path for moving the photography unit 2. Accordingly, the movement path of the photography unit 2, which properly shortens the inspection time for the inspection, is calculated without increasing the time necessary for the arithmetic process.

(Modifications)

Figure 11:
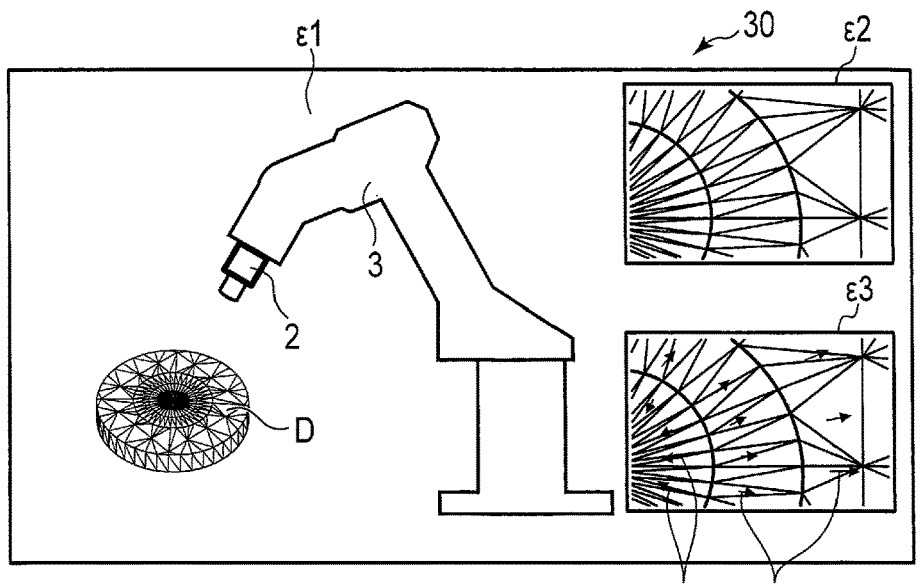
FIG. 11 is a schematic view illustrating an example of an image displayed on a display screen of a user interface in a processing device according to a certain modification.

In one modification, in the state in which the photography unit 2 is moving between the photography points along the path that is calculated as described above, the image processing unit 13 causes a display screen 30 of the user interface 8 to display an image that is illustrated in FIG. 11 by way of example. The image processing unit 13 causes the display screen 30 to display the image illustrated in FIG. 11, thereby reproducing, on the display screen 30, the state in which the photography unit 2 is moving between the photography points along the calculated path.

In the present modification, a display area ε1 of the display screen 30 displays an image in which the real-time position and attitude of the photography unit 2 are reproduced. In addition, in the display area ε1, the real-time state of the movable body 3 is reproduced, and the real-time position and attitude, or the like, of the connection portion of the movable body 3 to the photography unit 2 are reproduced. Furthermore, in the display area ε1, the real-time state of the inspection object D is reproduced. In the example of FIG. 11, in the inspection object D displayed in the display area ε1, many points P constituting the point group of the shape data are shown. In addition, in the inspection object D displayed in the display area ε1, the surface of the inspection object D is divided into the above-described many triangles T.

Besides, in the present modification, a display area ε2 of the display screen 30 displays an image that the photography unit 2 is photographing in real time. Specifically, the display area ε2 displays an image of that part of the surface of the inspection object D, which is being photographed in real time. In the example of FIG. 11, in the image displayed in the display area ε2, many points P constituting the point group of the shape data are shown on the surface of the inspection object D. In addition, in the image displayed in the display area ε2, the surface of the inspection object D is divided into the above-described many triangles T.

Furthermore, in the present modification, a display area ε3 of the display screen 30 displays an image indicative of information relating to normal vectors in a range that is being photographed in real time on the surface of the inspection object D. The information relating to the normal vectors in the range that is being photographed in real time is calculated based on a photography image that is being photographed in real time, and the shape data. In the image displayed in the display area ε3, a normal vector N to the surface of the inspection object D is shown in regard to each of locations in the range that is being photographed in real time. In addition, in the example of FIG. 11, in the image displayed in the display area ε3, many points P constituting the point group of the shape data are shown on the surface of the inspection object D. Besides, in the image displayed in the display area ε3, the surface of the inspection object D is divided into the above-described many triangles T.

In the present modification, like the above-described embodiment or the like, the path, which enables a quick inspection of the range that is the inspection target on the surface of the inspection object D, is properly calculated as the path for moving the photography unit 2. Moreover, in the present modification, the state in which the photography unit 2 is moving between the photography points along the calculated path is properly reproduced by the image displayed on the display screen 30.

Additionally, in the above-described embodiment and the like, by moving the movable body 3, the position and attitude of the photography unit 2 are varied. However, in one modification, the inspection object D may be moved relative to the photography unit 2, in such a state that the position of the photography unit 2 relative to the inspection object D corresponds to the path calculated by the path calculator 12. In this case, the attitude of the photography unit 2 is varied by moving the movable body 3. In addition, while moving the inspection object D in the state in which the position of the photography unit 2 relative to the inspection object D corresponds to the calculated path, the photography unit 2 photographs the inspection object at each of the photography points. Furthermore, in one modification, both the photography unit 2 and the inspection object D may be moved in such a state that the position of the photography unit 2 relative to the inspection object D corresponds to the path calculated by the path calculator 12.

According to at least one of the above-described embodiments or examples, analysis is executed in regard to a path that passes through all calculated photography points and that minimizes the sum of the movement cost from each of the photography points to a photography point that is the next movement destination, and a path corresponding to the analysis result is calculated as a path for moving the photography unit between the photography points. Thereby, there can be provided a processing device, an inspection system, a processing method and a non-transitory storage medium, which enable a quick inspection of a range that is an inspection target on a a surface of an inspection object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A processing device relating to an inspection of an inspection object with use of a photography unit, the photography unit being connected to a movable body, a position and an attitude of the photography unit varying in accordance with a movement of the movable body, the processing device comprising:
a processor configured to:
acquire shape data, a shape of a surface of the inspection object being indicated by a point group, information relating to a position and a normal vector on the surface of the inspection object being defined by using the point group in the shape data, the surface of the inspection object being divided into polygons based on the point group in the shape data;
calculate a plurality of photography points as positions for photographing the inspection object by the photography unit based on the shape data in such a state that, in each of the polygons disposed in an inspection range of the surface of the inspection object, any part of each polygon is included in the photography range of photography at one or more of the photography points; and
calculate a solution of an optimization problem regarding a path that passes through all of the calculated photography points and minimizes a sum of a movement cost from each of the photography points to a photography point that is a next movement destination, so that a path corresponding to the calculated solution of the optimization problem is set as a path for moving the photography unit between the photography points, the movement cost from each of the photography points to the photography point that is the next movement destination being calculated based on one or more of a variation of a position of a connection portion of the movable body to the photography unit, a variation of an attitude of the connection portion of the movable body to the photography unit, and a variation of a control amount of the movable body in addition to a variation of the position of the photography unit and a variation of the attitude of the photography unit.

2. The processing device of claim 1, wherein the processor is configured to calculate the solution of the optimization problem regarding the path that minimizes the sum of the movement cost, under a constraint condition that the photography points are successively passed one by one and each of the photography points is passed only once.

3. The processing device of claim 1, wherein the processor is configured to calculate, as the path for moving the photography unit between the photography points, any one of an optimal solution, a local optimal solution and an approximate solution of the optimization problem regarding the path that passes through all of the photography points and minimizes the sum of the movement cost.

4. The processing device of claim 1, wherein the processor is configured to determine a state of the surface of the inspection object, by image-processing an image that the photography unit photographs at each of the photography points.

5. The processing device of claim 4, wherein the processor is configured to implement displaying either an image indicative of a defect determined to be present on the surface of the inspection object, or an image in which a determination result of the defect is reflected on the shape data.

6. The processing device of claim 1, wherein the processor is configured to implement displaying any one of an image in which a real-time position and a real-time attitude of the photography unit are reproduced, an image that the photography unit is photographing in real time, and an image indicative of information relating to the normal vector in the range that is being photographed in real time on the surface of the inspection object, in a state in which the photography unit is moving between the photography points along the calculated path.

7. An inspection system comprising:
the processing device of claim 1;
the photography unit including an image-forming optical system and configured to photograph the inspection object by forming an image of the inspection object with use of the image-forming optical system; and
a movable body connected to the photography unit and configured to move, thereby varying the position and the attitude of the photography unit and rendering the photography unit movable between the photography points.

8. The inspection system of claim 7, wherein the photography unit is configured to photograph the inspection object at each of the photography points, in such an attitude that an angle of an optical axis of the image-forming optical system to the surface of the inspection object falls within a predetermine angle range.

9. The inspection system of claim 7, wherein the photography unit comprises:
an imaging element configured to form an image-forming surface of the image-forming optical system and configured to capture an image of light that is made incident through the image-forming optical system; and
a color filter including a wavelength selection region that passes light of a predetermined wavelength range, the color filter being disposed on an optical path of light that is incident on the imaging element through the image-forming optical system, and being configured to render the light of the predetermined wavelength range, which has passed through the wavelength selection region, incident on the imaging element.

10. A processing method relating to an inspection of an inspection object with use of a photography unit, the photography unit being connected to a movable body, a position and an attitude of the photography unit varying in accordance with a movement of the movable body, the processing method comprising:
acquiring shape data, a shape of a surface of the inspection object being indicated by a point group, information relating to a position and a normal vector on the surface of the inspection object being defined by using the point group in the shape data, the surface of the inspection object being divided into polygons based on the point group in the shape data;
calculating a plurality of photography points as positions for photographing the inspection object by the photography unit based on the shape data in such a state that, in each of the polygons disposed in an inspection range of the surface of the inspection object, any part of each polygon is included in the photography range of photography at one or more of the photography points; and calculating a solution of an optimization problem regarding a path that passes through all of the calculated photography points and minimizes a sum of a movement cost from each of the photography points to a photography point that is a next movement destination so that a path corresponding to the calculated solution of the optimization problem is set as a path for moving the photography unit between the photography points, the movement cost from each of the photography points to the photography point that is the next movement destination being calculated based on one or more of a variation of a position of a connection portion of the movable body to the photography unit, a variation of an attitude of the connection portion of the movable body to the photography unit, and a variation of a control amount of the movable body in addition to a variation of the position of the photography unit and a variation of the attitude of the photography unit.

11. A non-transitory storage medium storing a processing program relating to an inspection of an inspection object with use of a photography unit, the photography unit being connected to a movable body, a position and an attitude of the photography unit varying in accordance with a movement of the movable body, the processing program causing a computer to implement:

acquiring shape data, a shape of a surface of the inspection object being indicated by a point group, information relating to a position and a normal vector on the surface of the inspection object being defined by using the point group in the shape data, the surface of the inspection object being divided into polygons based on the point group in the shape data;

calculating a plurality of photography points as positions for photographing the inspection object by the photography unit based on the shape data in such a state that, in each of the polygons disposed in an inspection range of the surface of the inspection object, any part of each polygon is included in the photography range of photography at non or more of the photography points; and calculating a solution of an optimization problem regarding a path that passes through all of the calculated photography points and minimizes a sum of a movement cost from each of the photography points to a photography point that is a next movement destination so that a path corresponding to the calculated solution of the optimization problem is set as a path for moving the photography unit between the photography points, the movement cost from each of the photography points to the photography point that is the next movement destination being calculated based on one or more of a variation of a position of a connection portion of the movable body to the photography unit, a variation of an attitude of the connection portion of the movable body to the photography unit, and a variation of a control amount of the movable body in addition to a variation of the position of the photography unit and a variation of the attitude of the photography unit.

\* \* \* \* \*

UNITED STATES PATENT AND TRADEMARK OFFICE
CERTIFICATE OF CORRECTION

PATENT NO. : 12,136,238 B2
APPLICATION NO. : 17/675851
DATED : November 5, 2024
INVENTOR(S) : Sugiyama et al.

Page 1 of 1

It is certified that error appears in the above-identified patent and that said Letters Patent is hereby corrected as shown below:

In the Claims

- Claim 8, Column 20, Lines 34-35, "predetermine" should read as —predetermined—.

- Claim 11, Column 22, Line 11, "is non" should read as —is one—.

Signed and Sealed this
Fourth Day of March, 2025

Coke Morgan Stewart
*Acting Director of the United States Patent and Trademark Office*